Patented Nov. 4, 1941

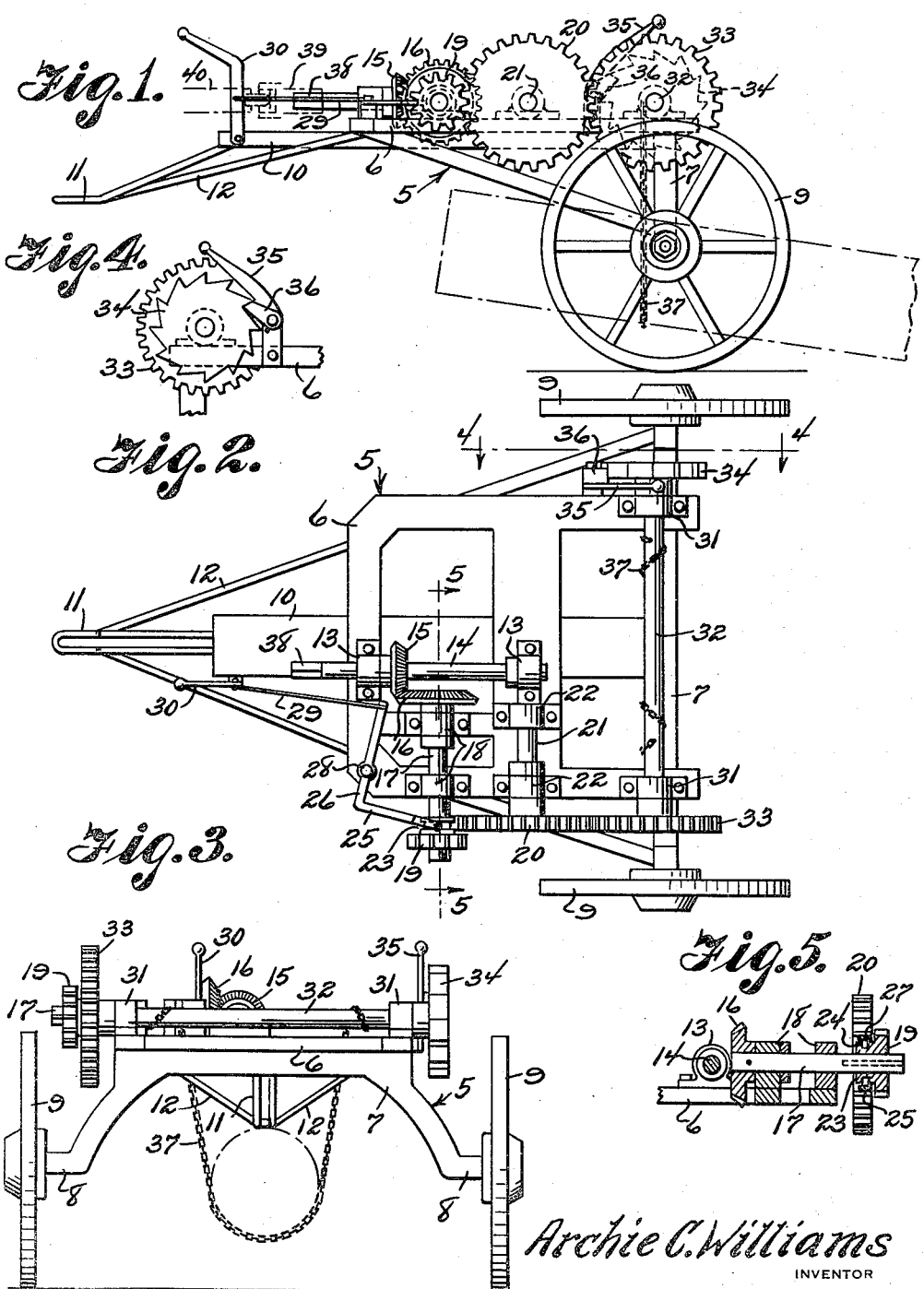

2,261,509

UNITED STATES PATENT OFFICE 2,261,509

AUTOMATIC LOG WAGON POWER TAKE-OFF LOADER AND UNLOADER

Archie C. Williams, Eagle Springs, N. C.

Application February 6, 1940, Serial No. 317,586

2 Claims. (Cl. 214—65.3)

My invention relates to carts or wagons employed for elevating and carrying logs and has as one of the principal objects thereof the provision of such a vehicle equipped with means for elevating and lowering the logs while said vehicle is at a standstill.

One of the principal objects of my invention is to provide a vehicle of the above described character equipped with means for raising and lowering the logs and which means is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a side elevation of a log wagon equipped with my invention.

Figure 2 is a top plan view thereof.

Figure 3 is a rear elevation.

Figure 4 is a fragmentary detail sectional view taken on the line 4—4 of Figure 2.

Figure 5 is a detail transverse sectional view taken on the line 5—5 of Figure 2.

In practicing my invention I employ a log cart or wagon 5 comprising a frame 6 having a rear end to which is subjacently attached an arched axle 7 provided with horizontally disposed end sections 8 on which are rotatably mounted wheels 9 for supporting the frame 6. The upper face of the frame 6 has attached thereto a centrally disposed member 10, the latter extending an appreciable distance forward of the frame and having connected thereto a U-shaped draft bar 11 for attachment to a suitable source of power (not shown) for operating the cart over the ground.

The draft bar 11 has fixed thereto converging ends of braces 12, the opposite ends of which are attached to the frame. The upper face of the frame 6 has mounted thereon a pair of spaced bearings 13 in which is journaled a longitudinally disposed power shaft 14, the latter having fixed thereto a bevel gear 15 adjacent the front bearing and meshing with a bevel gear 16 fixed on the inner end of a transverse shaft 17.

The transverse shaft 17 is mounted in a pair of spaced bearings 18 arranged laterally of the shaft 14 and one end of the shaft 17 extends an appreciable distance beyond the side of the frame 6 and has slidably keyed thereon a pinion 19 for meshing engagement with a spur-gear 20. The spur-gear 20 is fixed to the outer end of a transversely disposed stub shaft 21 mounted in spaced bearings 22 arranged rearwardly of the bearings 18 as clearly illustrated in Figure 2 of the drawing.

The pinion 19 has fixed thereto a groove collar 23 in which is mounted a relatively rotatable ring 24, the latter being pivotally connected to the bifurcated ends of an angularly disposed section 25 of an operating lever 26 through the medium of pins 27. The lever 26 is pivotally mounted on the frame 6 as at 28 and is connected at its inner end to the rear end of a rod 29. The forward end of said rod 29 is connected to an operating handle 30 having its lower end pivoted to the side of the member 10. Obviously, operation of the handle 30 serves to effect meshing and disconnection of the pinion with the gear 20, as the case may be.

The rear end of the frame 6 is provided with a pair of spaced bearings 31 through which is journaled the ends of a load lifting shaft 32. One end of the shaft 32 has fixed thereon a spur-gear 33 meshing with the gear 20 and the opposite end of said shaft 32 has fixed thereon a ratchet gear 34. Adjacent the ratchet gear 34 the frame 6 has pivoted thereto a lever 35 on which is pivotally mounted a pawl 36 for engagement with the teeth of the gear 34 to preclude rotation of said shaft 32 in one direction and permit rotation in the opposite direction. A chain 37 is permanently attached at one end to the shaft 32 and adapted to be secured at its opposite end to said shaft after said chain encircles a log to be elevated as clearly illustrated in dotted lines in Figure 1 of the drawing.

The front end of the shaft 14 is squared as at 38 for reception into a socket 39 attached to a rotatable power imparting device, for instance a shaft 40 as illustrated in dotted lines in Figure 1 of the drawing.

In use, the chain is passed around a log and the lever 35 operated to position the pawl 36 in engagement with the teeth of the gear 34. When the parts are thus positioned the handle 30 is operated to effect meshing of the pinion with the gear 20 and power applied to the shaft 14. Power applied to the shaft 14 serves to operate the shaft 17 through the medium of the gears 15 and 16. When the shaft 17 is thus operated the shaft 32 is rotated through the medium of the pinion 19 and gears 20 and 33 to elevate the log above the ground as illustrated in Figure 1 of the drawing. After the log has been moved to a desired location, the same may be lowered by operating the pinion 19 out of mesh with the gear 20 and releasing the pawl 36 through operation of the lever 35, thereby permitting a free rotation of the shaft 32 and unwinding of the chain 37.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in advance forms, and that the invention comprehends all construction within the scope of the appended claims.

What I claim is:

1. In apparatus of the character described, a wheeled frame, a drive shaft journaled longitudinally on the forward part of the frame, a countershaft journaled transversely on the frame and geared to the drive shaft, an idler shaft mounted parallel to the said countershaft having an idle gear mounted thereon, a pinion slidably keyed on the countershaft, mechanism for axialy shifting the said pinion to selectively engage the same with the idle gear, a lift shaft journaled transversely on the rear portion of the frame, a gear fixed on the lift shaft in mesh with the idle gear, a ratchet gear secured on one end of the lift shaft, a pivoted pawl selectively operative to engage the ratchet gear to preclude rotation of the lift shaft in one direction, and a chain fastened to the said lift shaft for winding thereon adapted to be suspended therefrom in loop formation.

2. In a log cart, a wheeled frame, a drive shaft journaled longitudinally on the forward portion of the frame, a bevel pinion secured on the intermediate portion of the drive shaft, a countershaft journaled transversely on the frame at one side of the drive shaft, a bevel gear fixed on the countershaft and in mesh with the pinion on the drive shaft, an idler shaft journaled on the frame parallel with and adjacent to the countershaft, an idle gear mounted on said idler shaft, a drive pinion slidably keyed on the outer end of the countershaft having a grooved collar at one side thereof, an angular lever pivoted horizontally on the frame having shifting connection with the said grooved collar for selectively shifting the drive pinion into engagement with the idle gear, an upstanding handle pivotally connected to the frame and having connection with the lever for operating the latter, a lift shaft journaled transversely across the rear end of the frame having a gear fixed on one end in mesh with the idle gear, a ratchet mechanism operative to prevent rotation of the said lift shaft in one direction, and a hoist chain attached to the end portion of the lift shaft disposed to form a suspension loop windable upon the lift shaft upon rotation of the latter.

ARCHIE C. WILLIAMS.